UNITED STATES PATENT OFFICE.

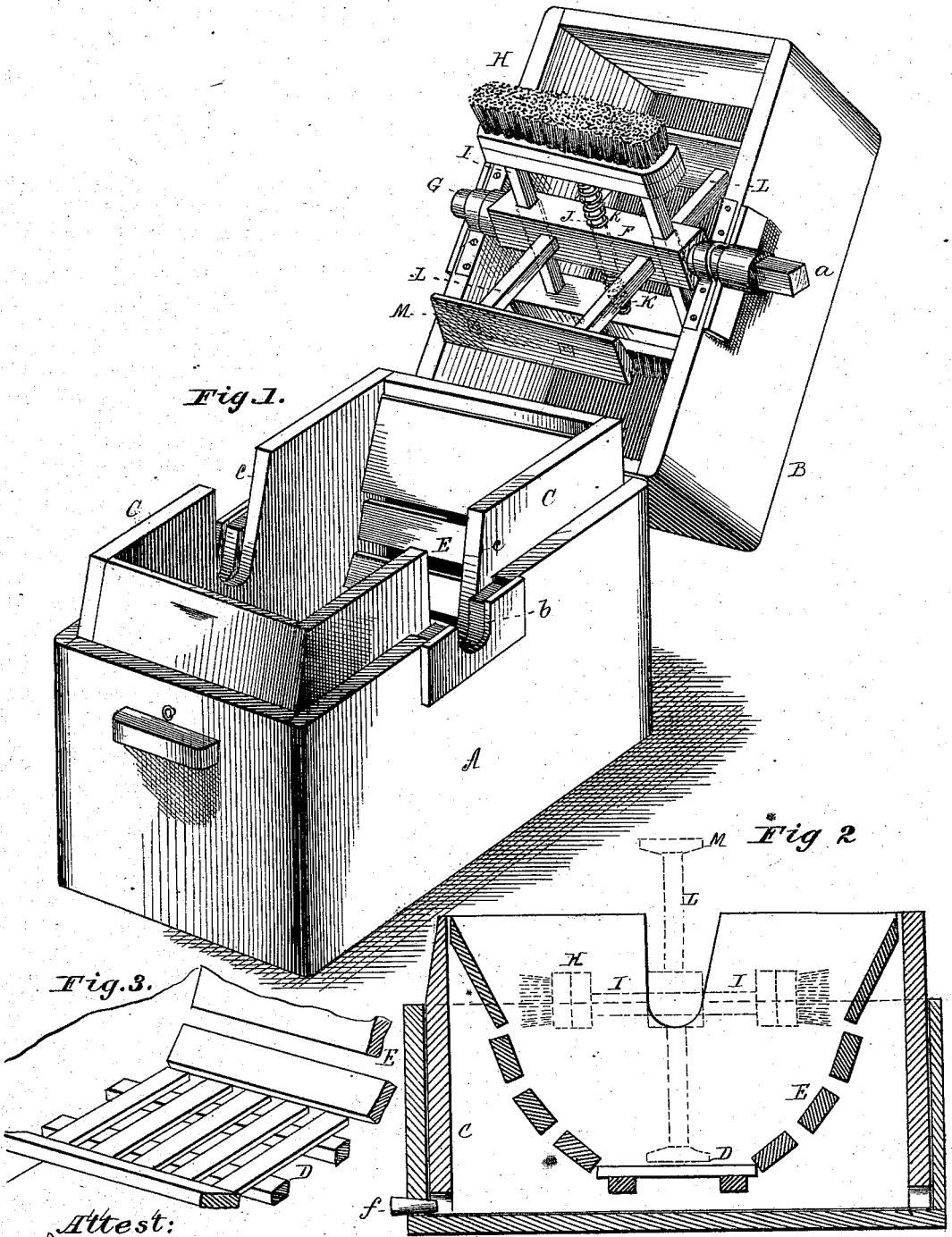

JAMES BROOKS, OF TRUMANSBURG, NEW YORK.

IMPROVEMENT IN VEGETABLE-WASHERS.

Specification forming part of Letters Patent No. 160,870, dated March 16, 1875; application filed February 1, 1875.

*To all whom it may concern:*

Be it known that I, JAMES BROOKS, of Trumansburg, in the county of Tompkins and State of New York, have invented certain new and useful Improvements in Apparatus for Washing Vegetables, of which the following is a specification:

This invention relates to improvements upon apparatus for washing or cleaning potatoes and other vegetables, in which a shaft, provided with a series of brushes, is arranged within a vessel in such manner as to rub and cleanse the vegetable. My invention consists, firstly, in the employment, in connection with a vessel or box for receiving the vegetable, of a revolving shaft, carrying brushes or bristle-heads, two or more in number, which are attached to sliding stems passing through mortises in the revolving shaft, one of the stems being encircled by spiral springs on both sides of the shaft, so as to render the brushes yielding or self-adjusting in relation to the vegetables as they pass over the same. The invention further consists in the combination, with self-adjusting or spring-pressed cleaning-brushes, of agitating blades or arms, which are arranged alternately with the brushes on the same revolving shaft, and made of a sufficient length to pass under or through the potatoes or vegetables for continually mixing or stirring the same, in order to present different surfaces to the action of the cleaning-brushes. The invention further consists in journaling the revolving shaft carrying the brushes and agitating-paddles in the top or hinged section of the receiving case or box, so that when said hinged section is raised or thrown back the cleaning devices will be carried with the same, for enabling a removable potato-receiving box or crate to be inserted into the outer casing or box, or to be removed therefrom.

In the accompanying drawings, Figure 1 is a perspective view of a potato-washer, constructed according to my invention, the top or hinged section being thrown back. Fig. 2 is a longitudinal section of the main casing and removable potato-receiving box. Fig. 3 is a detail view, showing the slatted bottom and ends of the removable receiving-box.

A designates the base-section of a box or casing, and B the top or upper section thereof, the two sections being hinged to each other at one end, so as to enable the top section to be raised and thrown back, in the manner fully represented in Fig. 1. The box or casing A, which is made water-tight, and generally of a rectangular form, is adapted to receive a removable or detachable box, C, of a corresponding shape, which box is provided with a slatted bottom, D, and with similar inclined end slats E. The slatted bottom is composed of longitudinal slats, resting upon transverse slats, while the strips or slats comprising the end walls extend only in a transverse direction. The slatted bottom and ends and the bottomless box C constitute a crate or receiving-box for the potatoes or other vegetables to be cleaned, so as to enable the same to be introduced into and removed from the main or water casing with great ease and facility. A shaft, F, journaled in boxes or yokes G, applied to the lower edges of the sides of the hinged section B of the casing, carries brushes or bristle-heads H, which are attached to the ends of stems or rods I J, passing loosely through mortises in the shaft. The centrally-located stems J are encircled by spiral springs K, which are located on opposite sides of the shaft, or one between each brush-head and the adjacent side of the shaft. Arms L, fixedly secured to the shaft F, and made somewhat longer than the brush-stems, carry at their outer ends paddles or transverse blades M, which are made to pass under or through the vegetables for stirring or agitating the same, in order to continually present fresh or uncleaned surfaces to the action of the brushes. The agitating-wings are located in alternate relation to the brushes, so that when the shaft F is revolved through the medium of a hand-crank applied to its square end *a*, the brush, which for the time being is traveling over the tops of the potatoes, will brush or clean the exposed surfaces, and then the agitating-blade follows and turns the potatoes, in order to cause the following brush to repeat the action of the preceding one. The brushes, by reason of their attachment to loose or sliding stems, encircled by spiral springs, are caused to bear upon the potatoes with sufficient pressure to remove all adhering dirt, the springs, however, not being strong enough to prevent the ready yielding of the brushes when they come in contact with potatoes or objects offering resistance to the progress of the brushes. The sides of the boxes A and C are recessed or slotted, as shown at $b$ $c$, so as to receive the shaft F and the journal-boxes on the lower edges of the hinged top section B. The water contained in the casing A and potato crate or box C is permitted to flow through the potatoes, so as to wash away the dirt loosened by the brushes, and convey the same through the slatted bottom and ends into the space left between said slatted bottom and the bottom of the box A. An opening, closed by a plug, $f$, is made in the latter for drawing off the dirty water.

The potatoes, after having been thoroughly washed, are removed, together with the entire receiving box or crate, the hinged top being first raised and thrown back, together with all the cleaning devices mounted in the same.

Having thus described my invention, what I claim as new, and desire to secure by Letters Patent, is—

1. In a potato or vegetable washer, the yielding or self-adjusting spring-pressed brushes, substantially as and for the purpose described.

2. The combination of the revolving shaft F, spring-pressed yielding brushes H, and agitating arms or blades M, substantially as herein shown and described.

3. In a potato-washer, the combination of the shaft F, brushes H, and agitators M, with the hinged top section B, base section A, and the removable potato receptacle or crate C, substantially as herein set forth.

In testimony that I claim the foregoing I have hereunto set my hand.

JAMES BROOKS.

Witnesses:
G. W. HOPKINS,
E. C. SEYMOUR.